United States Patent Office 2,928,124
Patented Mar. 15, 1960

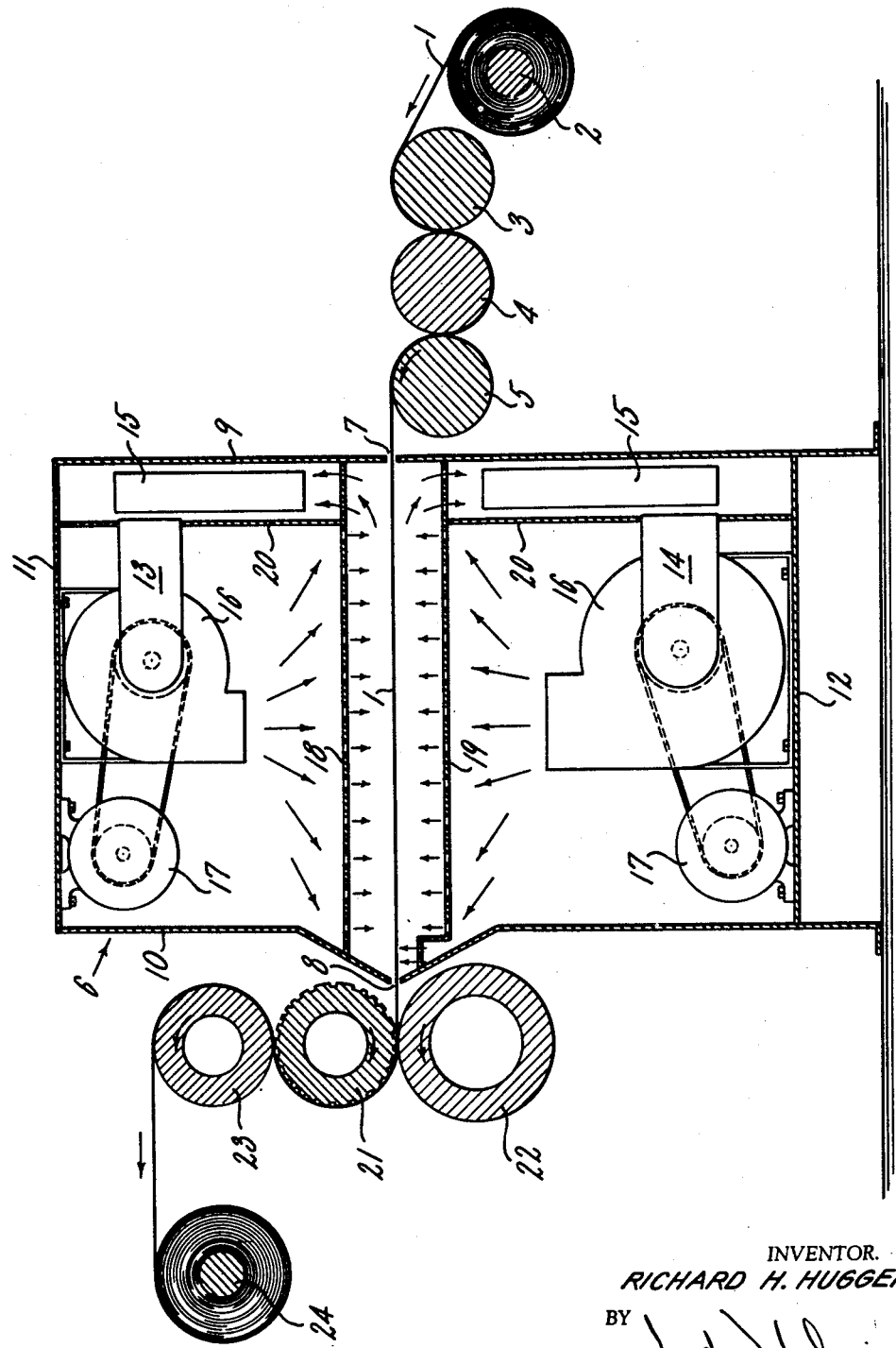

2,928,124

EMBOSSING METHOD AND APPARATUS

Richard H. Hugger, Ridgewood, N.J., assignor to United States Rubber Company, New York, N.Y., a corporation of New Jersey Application November 1, 1956, Serial No. 619,700

10 Claims. (Cl. 18—19)

This invention relates to an apparatus and a method for embossing thermoplastic sheets, and is particularly directed to an improved method and apparatus for embossing a sharp, clearly defined pattern on the surface of a continuous length of calendered plastic sheet without wrinkling or distorting the sheet, or marring the embossed pattern.

In general, the surface of a sheet of thermoplastic material, such as polyvinyl chloride or the like, is embossed by heating the sheet to a soft, plastic state, and then impressing a design into it by passing it through the nip of two embossing rolls, at least one of which carries an engraved design. Upon cooling, the material hardens, and the design becomes fixed.

Difficulties arise in this process because the plastic sheet, when heated to a temperature high enough to take and retain the embossed impression, is soft, weak, and sticky. It sticks to any hot surface with which it comes into contact, and the force required to pull it loose causes stretching and dis ortion of the sheet and/or the embossed pattern. Sheets of the thicknesses commonly used for embossing are often so soft and weak when hot that they cannot even support their own weight over any considerable span without sagging, stretching, and becoming distorted. Numerous methods, none of which gives completely satisfactory and trouble-free results, have been tried in an effort to overcome these difficulties. Most of these methods fall into one or the other of two classes, which may be termed cold-roll methods and hot-roll methods.

In the cold-roll methods, the sheet is pre-heated to the embossing temperature before it reaches the embossing rolls. The embossing rolls are kept at a temperature low enough to cool the surfaces of the sheet so that adhesion is reduced. These methods give sharp, clear embossing, with little or no trouble from adhesion and distortion at the embossing rolls. However, the sheet sticks to the rolls, belts, or other means for supporting the sheet while it is being heated, and becomes s retched and distorted before entering the nip of the embossing rolls.

In the hot-roll methods, the sheet is pre-heated before entering the embossing rolls to a temperature just below that at which it becomes weak and sticky, thus avoiding trouble up to this point, provided that the temperature is carefully controlled. The embossed roll which carries the engraving is kept hot enough to raise the surface layers of the sheet to the embossing temperature, the sheet remaining in contact with the embossed roll long enough to soften and to take the impression. Such hot-roll methods involve an unsatisfactory compromise. If the embossed roll is run hot enough to make a sharp, permanent impression, the embossed pattern is marred and distorted due to sticking to the roll. If the embossed roll is run cool enough to avoid sticking, the impression is liable to be shallow and indistinct, due to rubber-like elastic recovery of the plastic sheet upon its release from the nip of the rolls.

My invention consists in a method of obtaining the advantages of the cold-roll embossing method, while avoiding sticking and distortion of the sheet in the pre-heater. By the method of my invention, the sheet is raised to the embossing temperature in a final heater, through which it passes horizontally, and in which it is supported only by a current of air (or other gas) directed vertically against its lower surface. The softened sheet then passes from the final heater directly into the nip of the embossing rolls. Thus, the sheet, while it is at the embossing temperature and in a soft, weak, and sticky condition, is under little or no tension, and does not touch any surface. In the simplest form of apparatus for carrying out my invention, heating of the sheet is carried out entirely within the final heater. However, it is usually preferable (especially in the case of calendered sheets) to use a pre-heater, which brings the sheet to a temperature below that at which it becomes excessively soft and sticky, and delivers it to the final heater.

While any suitable means may be used to heat the sheet in the final heater, the simplest and most preferred method uses the supporting current of air, which is heated to a suitable temperature. A second current of hot air, directed against the upper surface of the sheet, is preferably also used to help in the heating. The temperatures and velocities of these two air currents are independently variable, and are controlled so that the sheet is supported and heated to the desired temperature during its passage through the final heater.

Upon leaving the final heater, the sheet enters the nip of the embossing rolls, which are located as close to the final heater as possible. The embossing rolls are run "cold," i.e., at a temperature below the embossing temperature of the plastic. From this point on the sheet its further handled in some well known manner; for example, it may be cooled on rolls or on a belt, and taken up on a reel for storage.

While my invention is applicable to any thermoplastic sheet of the nature described, it is of particular practical importance as applied to calendered sheets, since calendering is the most widely used method of making such sheets. The calendering operation, as is well known, produces internal stresses in the sheet, which result in a tendency of the sheet, as it leaves the nip of the calender rolls, to shrink in its leng.h-wise direction and to expand in width and thickness. These internal stresses must be removed before the sheet enters the final heater in the method of my invention, preferably without allowing the sheet to shrink appreciably, since shrinkage would result in uncontrollable variations in the dimensions of the sheet, particularly in the gauge, and would often cause undesirable surface roughness and waviness or ripples. I prefer to remove such stresses by annealing, which consists in keeping the sheet at or near its original length, preferably elongating it slightly, while holding it at an elevated tempera ure for a length of time sufficient to substantially release the internal stresses. This annealing step may be carried out as a separate operation, but is conveniently done in the pre-heater. The sheet may be fed directly from the calender into the pre-heater. However, it is often desirable, for the sake of flexibility in manufacturing operations, to keep the calendering and the embossing opera:ions independent of each other. In such cases, the calendered sheet may be annealed and taken up on reels as it leaves the calender; however, it is usually more convenient to cool it quickly and take it up on reels without allowing shrinkage. In the latter case, the internal stresses become "frozen," i.e., they do not manifest themselves as long as the sheet is cool, but become evident when it is heated. Such "frozen-in" stresses may be removed in a pre-heater which is designed to keep the sheet smooth and under a slight tension while heating it.

Further details of the invention with their advantages will appear from the description which will now be given in conjunction with the drawing appended hereto, which represents an apparatus illustrating the invention.

In the drawing, a calendered thermoplastic sheet 1 of a material such as polyvinyl chloride is shown carried on a feed reel 2 from which it is drawn over a series of rollers 3, 4, and 5. These rollers are heated by means not shown. The rollers 3, 4, and 5 pre-heat the sheet 1 to a temperature which is below its embossing temperature, but is sufficiently high to release by annealing any stresses that may exist in the material, due to the calendering operation. This temperature is called the annealing temperature; it varies with the nature of the material, and is generally around 350° F. for polyvinyl chloride plastics. To control the dimensions and smoothness of the sheet, the rollers 3, 4, and 5 are turned by suitable means (not shown) at different speeds, each roller turning slightly faster than the preceding roller. The temperatures of the rollers 3, 4, and 5 may likewise differ; they are adjusted to raise the temperature of the sheet as rapidly as possible to the annealing temperature, without overheating it and causing it to stick to the rollers. By this arrangement, the sheet is brought to and held at the annealing temperature with no possibility of dimensional changes, surface roughening, wrinkling, or other distortion. The number of rolls, their speed, and their temperatures are determined by the type of material, its thickness, and its rate of feed.

The sheet is delivered from the pre-heater rolls 3, 4 and 5 to an adjacent final heater 6 where the sheet temperature is raised to that required for embossing, for example 400° F. The final heater 6 is a closed, generally box-like oven having two horizontal slots or openings 7 and 8, in about the center of two of its opposite, substantially vertical sides 9, 10, that are large enough to allow the sheet 1 to pass through. The side 10 is expanded at the slot 8 to form a projection adapted to fit into the nip of cooperating embossing rolls, the purpose being to minimize cooling of the sheet before it enters the embossing rolls.

Within the oven 6 there are, suitably mounted to its top 11 and bottom 12, heater-blower units 13, 14, which are identical except for capacity. The unit 14, which is beneath the sheet 1, is necessarily the larger, since it is required to develop the force to support the sheet 1. In each of the units there is an air heater 15 and blower 16. The blowers 16, 16 are equipped with variable speed drives 17, 17 to enable adjustment of the air velocity; and the heaters 15, 15 have thermostats (not shown) for maintaining the desired air temperature.

The air above and below the sheet 1 is heated by the heaters 15, 15 and blown toward the sheet 1 through horizontal perforated plates 18, 19 suitably secured within the oven 6, which distribute the air evenly over the sheet. The air is then drawn back into the heaters (as shown by the arrows) through ducts formed by the wall 9 and a vertical partition 20 appropriately fastened to the sides of the oven 6.

If only one side of the sheet is to be embossed, that side only may be heated to the embossing temperature, the other side being brought to some lower temperature. This can be accomplished by suitably adjusting the temperatures of the air currents directed against the two sides of the sheet. It is understood, of course, that the velocities of the air currents are adjusted independently of each other and of the temperatures, so as to properly support the sheet. By selectively heating only the side to be embossed to the embossing temperature, the other side is cooler and stronger, and forms a reinforcing backing which provides the sheet with strength and facilitates stripping it from the embossing rolls through which it subsequently must pass.

Located adjacent to the slot 8 of the final heater 6 there is an embossing roll 21 having a pattern engraved on its surface that engages the side of the sheet to be embossed. A cooperating roll 22 (which may also be engraved) is provided opposite the embossing roll 21. The nip between these two rolls is adjusted to give the desired embossing without any substantial reduction in gauge of the sheet. Both the embossing roll 21 and the backing roll 22 are hollow and are provided with means for supplying a fluid, such as water, to keep the rolls colder than the plastic sheet which passes between them. The coldness of the rolls sets the thermoplastic material after the design is impressed into it and reduces the temperature of the sheet sufficiently to prevent sticking to the rolls. The sheet preferably remains in contact with the embossing roll 21 for a short time, passing partly around it, and then over the cooled roller 23. In that time it receives the impression and is cooled enough to set the impression and to enable stripping without deformation. The sheet is then wound up on a reel 24. Additional cooling rolls (not shown) may be placed intermediate the roll 23 and the wind up reel 24 where it is desired or necessary to further cool the sheet.

It will be apparent from the foregoing that an extremely simple and efficient apparatus and method for embossing thermoplastic material has been invented in which the support provided to the plastic sheet while in its sticky and weak condition is air. The use of air eliminates friction and tension which may develop between the sheet and any supporting surface which might otherwise be used, and, consequently, avoids undue pull at the point of embossing the sheet and the resulting marring of the imprint. Furthermore, since the sheet while at its embossing temperature is not in contact with any supporting surface, it is possible to emboss both sides of the thermoplastic sheet better than heretofore possible.

It is to be understood that the above description and drawing are for the purpose of illustration and not by way of limitation, and changes and modifications may be made therein without departing from the spirit and the scope of the invention. For example, the relative surface speeds of the pre-heater rolls (3, 4 and 5 in the drawing) are not critical; satisfactory operation has been obtained with all such rolls operating at the same surface speed except the last roll (5 in the drawing), which was run slightly faster than the others. Similarly, the details of the means for supplying the air currents in the final heater, and for controlling their temperatures and velocities, are only incidental to the method of the invention, and may be varied in ways well known in the art. It is not intended to limit the invention by any such details, nor otherwise except as defined in the following claims.

Having thus described my invention, what I claim and desire to protect by Letters Patent is:

1. The method of embossing thermoplastic sheet material, comprising the steps of continuously advancing said sheet material with one surface facing downwardly, simultaneously heating said material to an embossable, sticky, non-self-supporting condition and directing a current of a gaseous medium upwardly against said downwardly facing surface of said non-self-supporting sheet with sufficient velocity and in sufficient volume to support said non-self-supporting material out of contact with any solid support, and then embossing and simultaneously cooling said material.

2. The method defined in claim 1, wherein the step of heating said sheet material to an embossable, sticky, non-self-supporting condition is preceded by the step of pre-heating said sheet material to a temperature sufficiently high to release any stress tending to deform it, but lower than the temperature required to make said material sticky, and simultaneously extending said sheet material in the lengthwise direction.

3. The method defined in claim 1, wherein during the step of heating said material to an embossable, sticky, non-self-supporting condition, the surface of said material to be embossed is heated to a temperature higher than that to which the opposite surface is heated.

4. The method of embossing thermoplastic sheet material comprising the steps of continuously advancing said sheet material with one surface facing downwardly, directing currents of gas at a controlled temperature and velocity upwardly and downwardly against the upwardly and downwardly facing surfaces of said sheet to simultaneously heat said material to an embossable, sticky, non-self-supporting condition and support said non-self-supporting material by the kinetic forces of said upwardly directed gas currents, and then embossing and simultaneously cooling said sticky material.

5. An apparatus for embossing continuously advancing thermoplastic sheet material, comprising in combination an oven, means for advancing said sheet material through said oven so that one surface of said material faces downwardly, means for directing currents of gas upwardly in said oven against said downwardly facing surface of said sheet material with sufficient velocity and volume to float said sheet material on said currents by the kinetic forces exerted thereby on said downwardly facing surface, and means for heating said material in said oven to an embossing temperature while so floated, embossing rolls located immediately in advance of said floated material and adapted to receive said sheet material at said embossing temperature, and means for maintaining the temperature of the embossing surface of said rolls below the embossing temperature of said material.

6. An apparatus for embossing continuously advancing thermoplastic sheet material, comprising in combination an oven, means for advancing said sheet material through said oven so that one surface of said material faces downwardly, means for directing currents of gas upwardly in said oven against said downwardly facing surface of said sheet material, means for directing currents of gas downwardly in said oven against the upwardly facing surface of said sheet material, means for controlling the velocities and volumes of said currents to float said sheet material on said upwardly directed currents by the kinetic forces exerted thereby, means for heating said gases to a temperature sufficient to raise the temperature of said material to an embossing temperature while said sheet is so floated, embossing rolls located adjacent to the area of said gas floated material and adapted to receive said material at said embossing temperature, and means for maintaining the temperature of the embossing surface of said rolls below the embossing temperature of said material.

7. An apparatus for embossing continuously advancing calendered thermoplastic sheet material having a tendency to deform when heated and normally non-self-supporting and sticky at its embossing temperature, comprising in combination means for slightly elongating said sheet material while preheated to a temperature below the embossing temperature to dissipate its tendency to deform when further heated, an oven for receiving the sheet material from said elongating means, means for advancing said sheet material through said oven so that one surface of said material faces downwardly, means for directing currents of gas upwardly and downwardly against the opposite surfaces of said sheet, means for controlling said currents so that the kinetic forces exerted by said upwardly directed currents on said sheet material are sufficiently greater than the kinetic forces exerted by said downwardly directed currents to float said sheet material on said upwardly directed currents, means for heating said gas in said currents to a temperature sufficient to heat said material to an embossing temperature, embossing rolls located immediately in advance of said gas floated material and adapted to receive said material at said embossing temperature, and means for maintaining the temperature of the embossing surface of said rolls below the embossing temperature of said material.

8. An apparatus as defined in claim 7, wherein said means for slightly elongating said sheet material comprises a series of heated rotated rolls for preheating and conveying said sheet material which passes therebetween, means for controlling the temperatures of said rolls to heat said material sufficiently to release any stresses tending to deform it, but below that required to make the sheet sticky, and means for driving the last preheating roll of said series at a surface speed which is no less than the surface speed of the other rolls and higher than the first roll of said series.

9. An apparatus for embossing continuously advancing thermoplastic sheet material, comprising in combination an oven, means for advancing said sheet material through said oven so that one surface of said material faces downwardly, means for directing currents of gas upwardly in said oven against said downwardly facing surface of said sheet material, means for controlling the velocities and volumes of said currents to float said sheet material on said upwardly directed currents by the kinetic forces exerted thereby, and means for heating said material in said oven to an embossing temperature while so floated, embossing rolls located immediately in advance of said floated material and adapted to receive said sheet material at said embossing temperature, and means for maintaining the temperature of the embossing surface of said rolls below the embossing temperature of said material.

10. An apparatus for embossing continuously advancing thermoplastic sheet material, comprising in combination an oven, means for advancing said sheet material through said oven so that one surface of said material faces downwardly, means for directing currents of gas upwardly in said oven against said downwardly facing surface of said sheet material with sufficient velocity and volume to float said sheet material on said currents by the kinetic forces exerted thereby on said downwardly facing surface and for heating said material in said oven to an embossing temperature while so floated, embossing rolls located immediately in advance of said floated material and adapted to receive said sheet material at said embossing temperature, and means for maintaining the temperature of the embossing surface of said rolls below the embossing temperature of said material.

References Cited in the file of this patent

UNITED STATES PATENTS

| 2,135,763 | Nicholson | Nov. 8, 1938 |
| 2,387,886 | Devol | Oct. 30, 1945 |
| 2,582,777 | Grozinger | Jan. 15, 1952 |
| 2,689,378 | Muth et al. | Sept. 21, 1954 |
| 2,706,310 | Eckler et al. | Apr. 19, 1955 |
| 2,854,697 | Ryan | Oct. 7, 1958 |

FOREIGN PATENTS

| 719,964 | Great Britain | Dec. 8, 1954 |